United States Patent
Dreyfoos et al.

(10) Patent No.: US 11,440,682 B2
(45) Date of Patent: Sep. 13, 2022

(54) METHOD AND SYSTEM FOR TESTING PERFORMANCE OF FLIGHT CONTROL SURFACE SYSTEMS

(71) Applicant: The Boeing Company, Chicago, IL (US)

(72) Inventors: Aron Whittemore Dreyfoos, Seattle, WA (US); John Scott Finigan, Edgewood, WA (US); Gregory John Hughes, Seattle, WA (US); Andres Ramos, Seattle, WA (US)

(73) Assignee: The Boeing Company, Chicago, IL (US)

( * ) Notice: Subject to any disclaimer, the term of this patent is extended or adjusted under 35 U.S.C. 154(b) by 27 days.

(21) Appl. No.: 16/746,639

(22) Filed: Jan. 17, 2020

(65) Prior Publication Data

US 2021/0221538 A1   Jul. 22, 2021

(51) Int. Cl.
*G01M 13/00*   (2019.01)
*B64F 5/60*   (2017.01)

(52) U.S. Cl.
CPC ............... *B64F 5/60* (2017.01); *G01M 13/00* (2013.01)

(58) Field of Classification Search
CPC .................................. G01M 13/00; B64F 5/60
See application file for complete search history.

(56) References Cited

U.S. PATENT DOCUMENTS

| 4,917,329 | A | * | 4/1990 | Vollmerhausen | ........ B64D 5/00 244/2 |
| 5,775,639 | A | * | 7/1998 | Fage | ......................... F02K 1/60 244/11 OB |
| 9,454,911 | B2 | | 9/2016 | Finigan et al. | |
| 2013/0174665 | A1 | | 7/2013 | Silva | |
| 2016/0031546 | A1 | * | 2/2016 | Rolston | ..................... B64C 3/58 244/213 |
| 2016/0035239 | A1 | * | 2/2016 | Finigan | .................... G01N 3/04 73/865.6 |
| 2016/0236773 | A1 | * | 8/2016 | Jolly | ..................... B64C 27/001 |
| 2016/0251075 | A1 | * | 9/2016 | Thompson | ............ B64C 23/072 244/198 |
| 2016/0272303 | A1 | * | 9/2016 | Schmidt | .................. B64C 25/58 |
| 2016/0272305 | A1 | * | 9/2016 | Schmidt | .................. B64C 25/10 |
| 2017/0268958 | A1 | * | 9/2017 | Basham | ................ G01M 5/005 |
| 2020/0255124 | A1 | * | 8/2020 | Tessier | ...................... B64C 3/44 |
| 2020/0269971 | A1 | * | 8/2020 | Xi | .............................. B64C 9/00 |
| 2020/0290729 | A1 | * | 9/2020 | Charafeddine | ......... B64C 13/30 |

FOREIGN PATENT DOCUMENTS

| CN | 104697758 A | 6/2015 |
| EP | 3363742 A1 | 8/2018 |
| WO | WO 2007/050561 A | 5/2007 |

* cited by examiner

*Primary Examiner* — Eric S. McCall

(74) *Attorney, Agent, or Firm* — Haynes and Boone, LLP

(57) ABSTRACT

A method, apparatus, and system for testing a performance of a device under different load conditions is provided. A load profile to be applied to the device by a linkage system that includes a support member, a load member, and an actuating member is identified. A value for a setting of an actuator of the actuating member is determined based on the load profile. The actuator is operated with the setting having the value determined such that a load is applied to a control surface of the device via the load member. The load applied to the control surface is determined by both the value for the setting of the actuator and a geometry of the linkage system.

24 Claims, 14 Drawing Sheets

METHOD AND SYSTEM FOR TESTING PERFORMANCE OF FLIGHT CONTROL SURFACE SYSTEMS

FIELD

This disclosure relates generally to testing flight control surfaces and, more particularly, to methods and systems that use linkage systems with actuators to easily, quickly, and accurately test the performance of flight control surface systems under simulated aerodynamic load conditions.

BACKGROUND

Aircraft control surfaces, also referred to as flight control surfaces, are aerodynamic devices that allow an aircraft to be maneuvered to control the attitude or (orientation of the aircraft. A control surface device may include, for example, the flight control surface, an attachment structure for attaching the flight control surface to a portion of the aircraft (e.g., a wing, a tail), and a movement system for moving the flight control surface. An aircraft may have any number of control surface devices such as, but not limited to, rudder devices, elevator devices, spoiler devices, aileron devices, and flaperon devices.

With certain types of aircraft, control surface devices are commanded by a control system that is not mechanically connected to the control surface devices. This control system (e.g., a fly by wire control system) may use flight control computers that respond to sensor input driven by pilot controls. Typically, testing is required to ensure that the control surface devices and one or more control systems on an aircraft meet requirements and comply with regulations.

Testing may be performed to demonstrate the structural integrity and performance of the control surface device. Generally, testing a control surface device includes applying simulated aerodynamic loads to a test device that is, represents, or simulates a control surface device in a lab environment.

But some currently available testing methods and systems require multiple reconfigurations of the test device, testing equipment, or both in order to test multiple load conditions. Reconfiguring a test device or testing equipment repeatedly to test different load conditions may involve more complexity and take more time than desired. Further, existing testing methods and systems may not provide the level of adjustability needed to accurately apply loads with the desired magnitudes and directions (e.g., vectors) for a variety of load conditions.

Therefore, it would be desirable to have a method and system that take into account at least some of the issues discussed above, as well as other possible issues.

SUMMARY

In one illustrative example, an apparatus for testing a performance of a device under different load conditions includes a frame and a linkage system connected to the frame. The linkage system comprises a support member movably connected to the frame; an actuating member movably connected to the frame; and a load member that is movably connected to the actuating member, the support member, and the device. Operation of the actuating member when the load member is connected to the device loads the device.

In another illustrative example, a system for testing a performance of a device under different load conditions comprises a platform and a load application system. The load application system comprises a plurality of load systems attached to the platform. Each of the plurality of load systems comprises a frame and a linkage system connected to the frame. The linkage system comprises a support member connected to the frame; an actuating member connected to the frame; and a load member that is movably connected to the actuating member, the support member, and the device. Operation of the actuating member when the load member is connected to the device loads the device.

In yet another illustrative example, a method for testing a performance of a device under different load conditions is provided. The method includes identifying a load profile to be applied to the device by a linkage system that includes a support member, a load member, and an actuating member. The method further includes determining a value for a setting of an actuator of the actuating member based on the load profile. The method further includes operating the actuator with the setting having the value determined such that a load is applied to a control surface of the device via the load member. The load applied to the control surface is determined by both the value for the setting of the actuator and a geometry of the linkage system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

DETAILED DESCRIPTION

The example embodiments described below provide methods and systems for accurately applying aerodynamic loads to a test device that is, represents, or simulates a control surface device in a lab environment. In particular, complex load profiles may be easily and accurately created in the lab environment without requiring reconfiguration of the test equipment or apparatus used to test the test device. Further, adjustments to these load profiles may be remotely controlled. A load profile may include one or more discrete loads that are to be applied at one or more corresponding load points along a test device.

In one example embodiment, a load application system includes one or more load systems that are used to apply a load profile to a test device. The load profile may include or be based on normal operational loads, limit loads, proof or ultimate loads, one or more other types of loads, or a combination thereof. Each load system includes a linkage system having a geometry that allows for highly repeatable and predictable loads to be applied continuously at a corresponding load point on the test device. The repeatability and predictability provided by this load application system, when coupled with the ability to remotely adjust the load profile being applied to the test device, allows for continuous and rapid load adjustments. In this manner, the overall time needed for testing and the complexity associated with testing may be reduced. In particular, the methods and systems described herein allow for accurate and easy recreation of flight-equivalent hinge loads and moments into the test device. For example, the methods and systems desired herein ensure that loads with the desired vectors (e.g., the desired magnitude and direction) may be applied.

Figure 1:
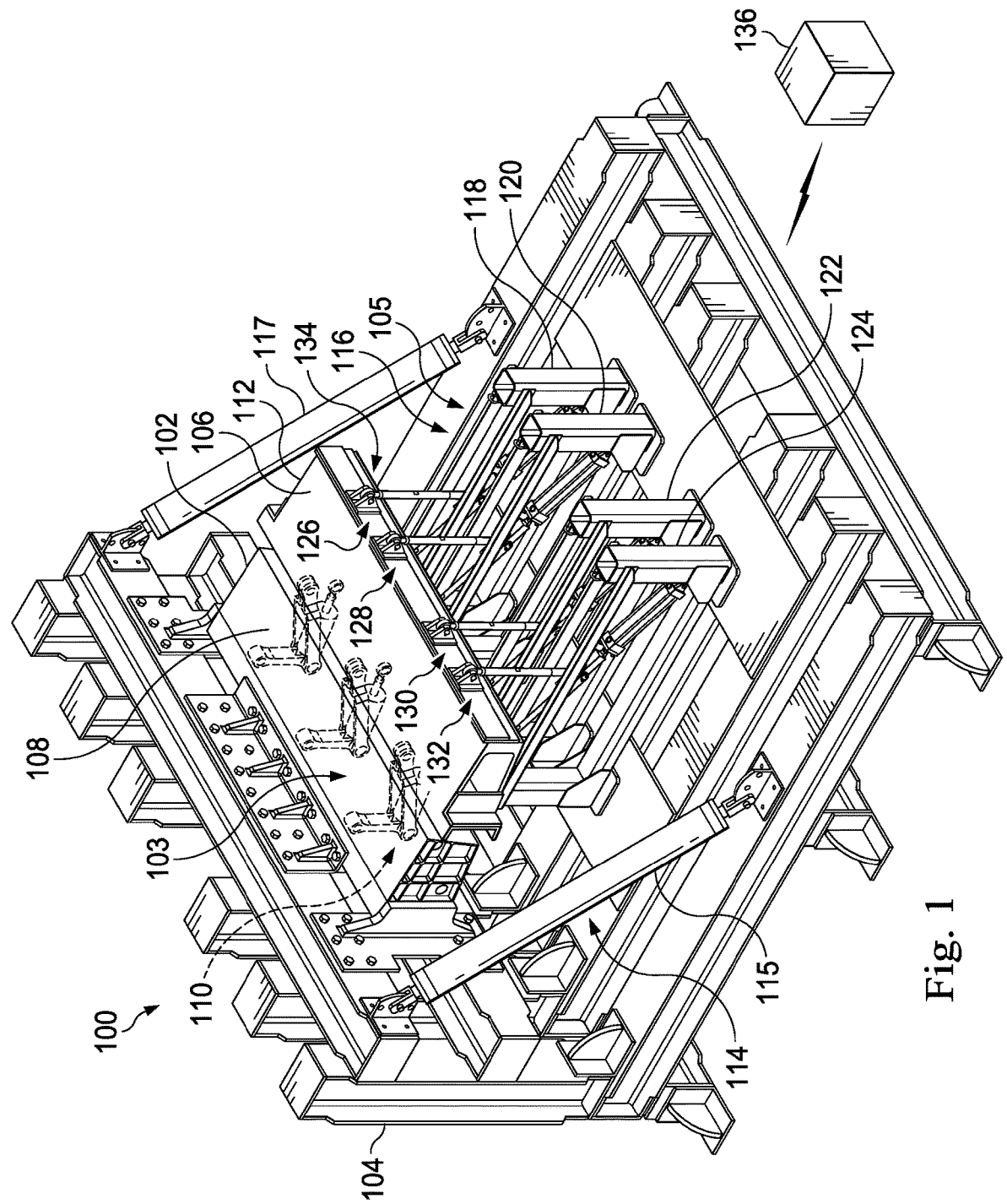
FIG. 1 is an illustration of an isometric view of a test system in accordance with an example embodiment.

Referring now to the figures, FIG. 1 is an illustration of an isometric view of a test system in accordance with an example embodiment. Test system 100 is used to test the performance of device 102 under simulated aerodynamic loads. Test system 100 may be used to test device 102 in a lab environment or some other type of test environment.

Test system 100 includes base structure 103, platform 104, and load application system 105. Load application system 105 and base structure 103 are attached to or otherwise secured to platform 104. Platform 104 is used to support device 102. In particular, base structure 103 is used to attach device 102 to platform 104. For example, device 102 may be attached to platform 104 indirectly via base structure 103. In some cases, base structure 103 may be considered part of or otherwise integrated in platform 104.

Device 102, which may also be referred to as a test device, may include any number of components, systems, or combinations thereof. In these illustrative examples, device 102 is or is a model of a control surface device. In some cases, device 102 is a representation or simulated version of a control surface device.

Device 102 includes control surface 106, attachment structure 108, and movement system 110. In other examples, device 102 includes control surface 106 and either attachment structure 108 or movement system 110. Movement system 110 is shown via dashed lines because movement system 110 is hidden by attachment structure 108 in this view.

Control surface 106 is, is a model of, or otherwise represents a flight control surface for an aircraft. For example, control surface 106 may be a representative flight control surface or a representation of a portion of the flight control surface that may include the trailing edge. In another example, control surface 106 may be the actual flight control surface to be installed on an aircraft. A flight control surface may take the form of a rudder, an elevator, a flaperon, an aileron, a spoiler (e.g., an outboard spoiler, a mid-board spoiler, an inboard spoiler), or some other type of flight control surface. In these illustrative examples, control surface 106 takes the form of elevator 112 and accordingly, device 102 may be referred to as an elevator device.

As described above, device 102 is attached to platform 104 via base structure 103. When control surface 106 takes the form of elevator 112 (i.e., device 102 is an elevator device), base structure 103 includes or represents the portion of an aircraft to which elevator 112 would be attached. For example, base structure 103 may include, represent, or model the portion of the tail of an aircraft (e.g., a horizontal stabilizer) to which elevator 112 would be connected. In other illustrative examples, base structure 103 may be or represent at least a portion of some other aircraft structure. For example, when control surface 106 takes the form of an aileron, a flaperon, or a spoiler, base structure 103 may be or represent at least some portion of a wing spar. When control surface 106 takes the form of a rudder, base structure 103 may be or represent at least some portion of a rudder spar.

Attachment structure 108 includes one or more components or systems for attaching control surface 106 to base structure 103. For example, attachment structure 108 may include the one or more components or systems for attaching elevator 112 to a horizontal stabilizer of an aircraft. As described above, base structure 103 may be, represent, or model the horizontal stabilizer in these examples. Thus, attachment structure 108 is used to attach elevator 112 to base structure 103 to simulate the attachment of elevator 112 to a horizontal stabilizer. Attachment structure 108 may include, for example, without limitation, at least one of a rib, a plate, a fitting, a hinge device, a fastener device, a beam, a strap, a support component, a pin, a post, a clamping system, or some other type of component.

Movement system 110 is connected to control surface 106 and used to move control surface 106 relative to attachment structure 108, and thereby relative to base structure 103. In other illustrative examples, movement system 110 is used to move control surface 106 and attachment structure 108, or some portion of attachment structure 108, relative to base structure 103.

In these illustrative examples, movement system 110 includes a hydraulic actuator system. In other illustrative examples, movement system 110 may include any number of movement devices. For example, movement system 110 may include at least one of a hydraulic actuator, an electro-mechanical actuator, a motor device, a track system, a reaction link, an electrohydraulic servo valve, or some other type of movement device. In some cases, movement system 110 may also include one or more other components for connecting movement system 110 to control surface 106, attachment structure 108, or both. For example, movement system 110 may include at least one of a rib, a plate, a fitting, a hinge device, a fastener device, a beam, a strap, a support component, a pin, a post, a clamping system, or some other type of component.

In these examples, platform 104 used to support device 102 may include any number of beams, barrels, structural components, fastening devices, or combination thereof. Base structure 103, which may be part of or attached to platform 104, may similarly include any number of beams, barrels, structural components, fastening devices, or combination thereof. In some illustrative examples, support system 114, which may be part of or attached to platform 104, helps provide additional support for base structure 103. Support system 114 may include, for example, support 115 and support 117.

Load application system 105 of test system 100 includes one or more load systems. For example, load application system 105 may include a plurality of load systems 116. In one illustrative example, load systems 116 include load system 118, load system 120, load system 122, and load system 124.

Each of load systems 116 is connected to device 102. In particular, in these illustrative examples, each of load systems 116 is connected to control surface 106 of device 102. Load systems 116 are used to apply various load profiles to device 102 to test the performance of at least one of control surface 106, attachment structure 108, or movement system 110. For example, load systems 116 may be used to simulate the aerodynamic loads that would be experienced by device 102 during flight.

Load systems 116 may apply a load profile to control surface 106 and thereby, device 102, by each of load systems 116 applying a discrete load to a corresponding load point on control surface 106. In particular, load system 118, load system 120, load system 122, and load system 124 may apply a discrete load to corresponding load point 126, corresponding load point 128, corresponding load point 130, and corresponding load point 132, respectively. In some cases, each of load systems 116 applies the same (within selected tolerances) discrete load to control surface 106. In other cases, at least one of load systems 116 may apply a different load to control surface 106 than another one of load systems 116.

The performance of device 102 under various aerodynamic load conditions may be tested in different ways. In one example, load application system 105 is controlled to apply a selected load profile to control surface 106. While this selected load profile is applied to control surface 106 and thereby, device 102, movement system 110 is used to move control surface 106 through a plurality of test positions relative to attachment structure 108 and thereby, base structure 103. For example, movement system 110 may rotate or sweep control surface 106 through a range of test positions while each of load systems 116 loads (or applies a discrete load to) control surface 106 based on the selected load profile. In this manner, the performance of control surface 106 at each of the test positions may be tested under the selected load profile.

In another example, load application system 105 is controlled to apply various load profiles at each of a plurality of test positions. For example, at a given test position for control surface 106, each of load systems 116 may load (or apply a discrete load to) control surface 106 based on a selected load profile. This loading may be repeated for various load profiles at the given test position, which may be a position angled away from a neutral position for control surface 106. For example, the discrete loads applied by load systems 116 may be incrementally increased until a "blowback" condition is reached in which control surface 106 is blown back (e.g., downwards, upwards, or sideways) towards the neutral position. This blowback condition occurs when maximum load limits are reached. In this manner, the maximum load limits for control surface 106, attachment structure 108, movement system 110, or a combination thereof may be determined for each of the plurality of test positions.

In FIG. 1, control surface 106 is shown at neutral position 134. In this example, neutral position 134 is a test position in which control surface 106 is angled at about 0 degrees relative to base structure 103. Other test positions for control surface 106 may include positions angled downward with respect to base structure 103, positions angled upward with respect to base structure 103, or both. When control surface 106 is in neutral position 134, no load is applied to control surface 106. When control surface 106 is moved from neutral position 134 into a test position, a load (tension load or compression load) is applied to control surface 106.

In these illustrative examples, test system 100 also includes remote control unit 136. Remote control unit 136 may be comprised of hardware, software, firmware, or a combination thereof. In one illustrative example, remote control unit 136 includes a computer or processor that is capable of remotely communicating with load application system 105. For example, remote control unit 136 may include a computer that communicates with load application system 105 wirelessly (e.g., over one or more wireless communications links) to remotely control the load applied to control surface 106 by each of load systems 116.

Thus, test system 100 may be used to easily and accurately test the structural integrity of device 102 for various aerodynamic load conditions. Further, tests may be run to ensure that device 102 is free from jamming, excessive friction, and excessive deflection when the various simulated aerodynamic loads are applied to device 102. When device 102 is an aircraft system, test system 100 may be used to perform these tests based on, for example, the maximum load limits expected during the nominal operation of device 102 within the aircraft, loads in excess of normal operational loads, loads for corner or extreme flight conditions, or a combination thereof.

Figure 2:
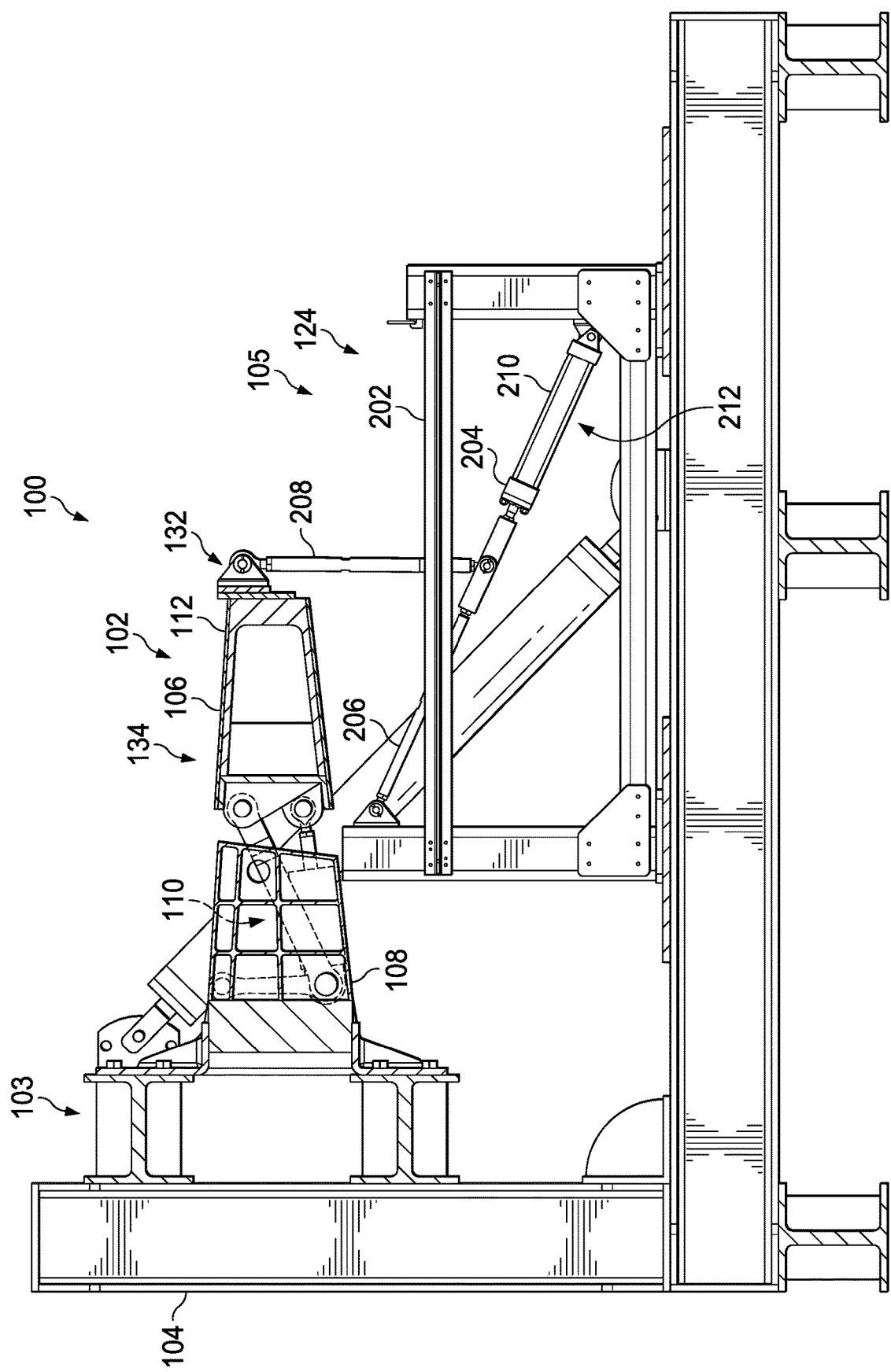
FIG. 2 is an illustration of a side view of the test system from FIG. 1 in accordance with an example embodiment.

FIG. 2 is an illustration of a side view of test system 100 from FIG. 1 in accordance with an example embodiment. In this illustrative example, support 115 is not shown to allow the various components of load system 124 of load application system 105 to be more clearly seen. Load system 124 includes frame 202 and linkage system 204. Frame 202 is secured to platform 104.

Linkage system 204 includes support member 206, load member 208, and actuating member 210. Support member 206 and actuating member 210 are movably connected to frame 202. Load member 208 is movably connected to support member 206 and actuating member 210. Further, load member 208 is movably connected to device 102. In particular, load member 208 is movably connected to control surface 106 of device 102.

Movement of control surface 106 causes movement of linkage system 204. In particular, control surface 106 moving out of neutral position 134 causes load member 208 connected to control surface 106 to move. In turn, support member 206 and actuating member 210 are moved relative to frame 202. In this manner, the configuration of linkage system 204 changes as control surface 106 moves.

However, linkage system 204 is connected to frame 202 and control surface 106 such that load member 208 is always maintained at an angle that is perpendicular to or within selected tolerances of perpendicular to control surface 106. The selected tolerances may be, for example, within about 3 degrees, about 5 degrees, about 10 degrees, or some other range of degrees from a perpendicular angle. Maintaining this perpendicular or near-perpendicular angle helps reduce or eliminate undesired load vectors being applied to control surface 106 outside of the desired load profile to be applied to control surface 106. In particular, maintaining this perpendicular or near-perpendicular angle helps ensure that the load profile actually applied to control surface 106 accurately represents the load profile, or load condition, that is intended to be tested.

As depicted, control surface 106 is in neutral position 134. With control surface 106 at neutral position 134, linkage system 204 has neutral configuration 212. Neutral configuration 212 is defined by the position of support member 206, load member 208, and actuating member 210 relative to each other and to frame 202. In neutral configuration 212, no load is applied to control surface 106 and all load is reacted through frame 202.

When control surface 106 is moved out of neutral position 134, load system 124 may load device 102 via the connection between load member 208 and control surface 106 at corresponding load point 132. In this illustrative example, load systems 118, 120, and 122 in FIG. 1 are operated in a manner similar to load system 124 at the same time as load system 124 to thereby apply a load profile to device 102.

Each of load systems 118, 120, 122, and 124 applies a discrete load to device 102 to thereby apply a load profile to device 102. The discrete load applied to device 102 by a given load system is a function of the setting of the actuator of that load system (e.g., the actuator associated with actuating member 210 of load system 124) and the "geometry" of the linkage system of that load system. The "geometry" of a linkage system may include, for example, the orientation of each of support member 206, load member 208, and actuating member 210 relative to each other and the lengths of these three members. Further, this "geometry" may include how and where support member 206 and actuating member 210 are connected to frame 202.

Figure 3:
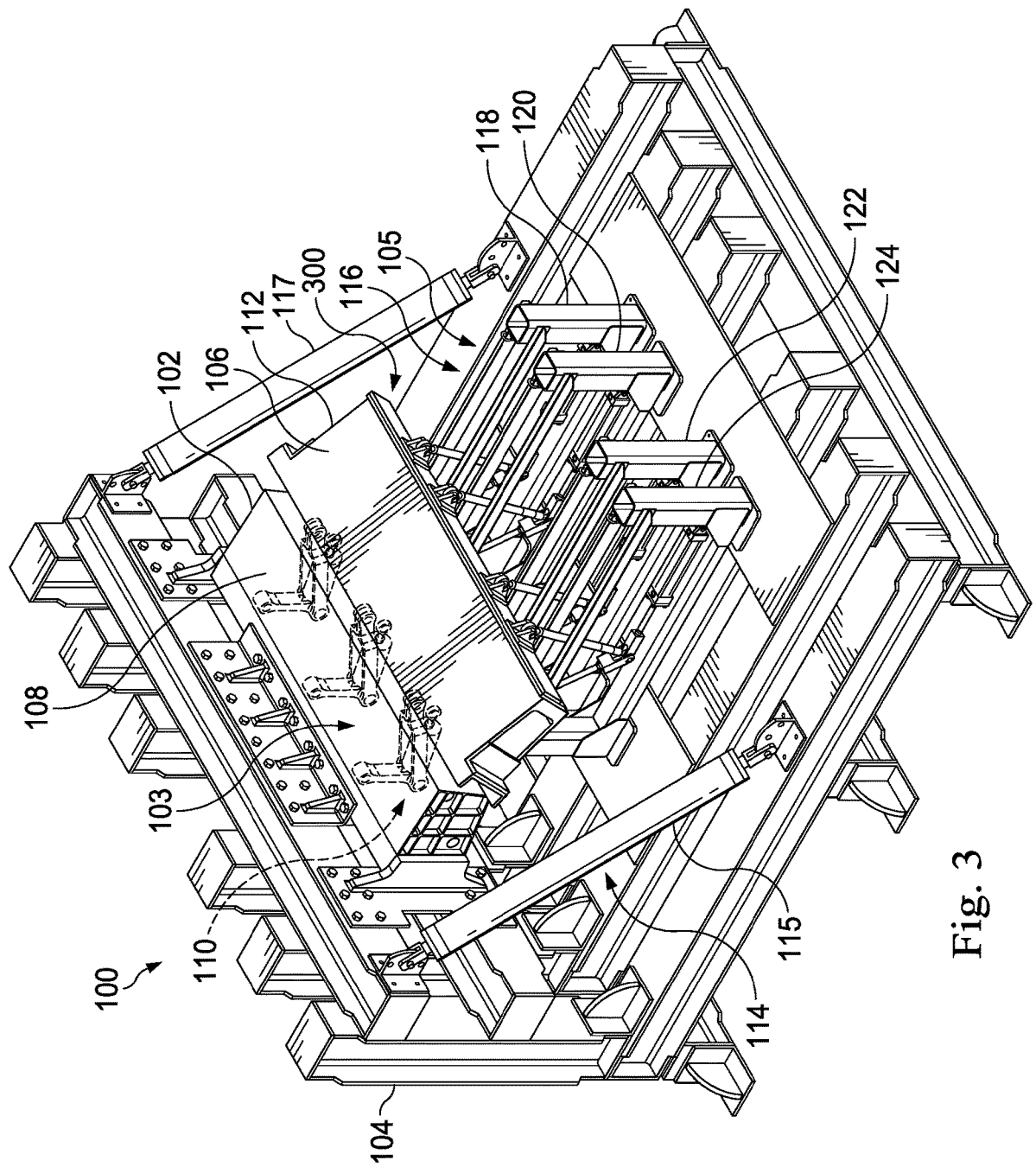
FIG. 3 is an illustration of the test system from FIG. 1 with the control surface at a test position in accordance with an example embodiment.

FIG. 3 is an illustration of test system 100 from FIG. 1 with control surface 106 at a test position in accordance with an example embodiment. Control surface 106 is shown at test position 300. Test position 300 is one in which control surface 106 is angled upwards relative to attachment structure 108, and thereby base structure 103. In this example, control surface 106 is angled at about 37.5 degrees downward relative to neutral position 134 shown in FIGS. 1 and 2.

In one illustrative example, with control surface 106 in test position 300, test system 100 may be used to apply one or more load profiles to control surface 106. For example, an initial load profile may be applied to control surface 106. The initial load profile may be an initial loading condition of zero load or a predetermined minimum load. Test system 100 may then sweep through one or more additional load profiles, increasing the loads applied to control surface 106 until maximum load limits are reached.

Figure 4:
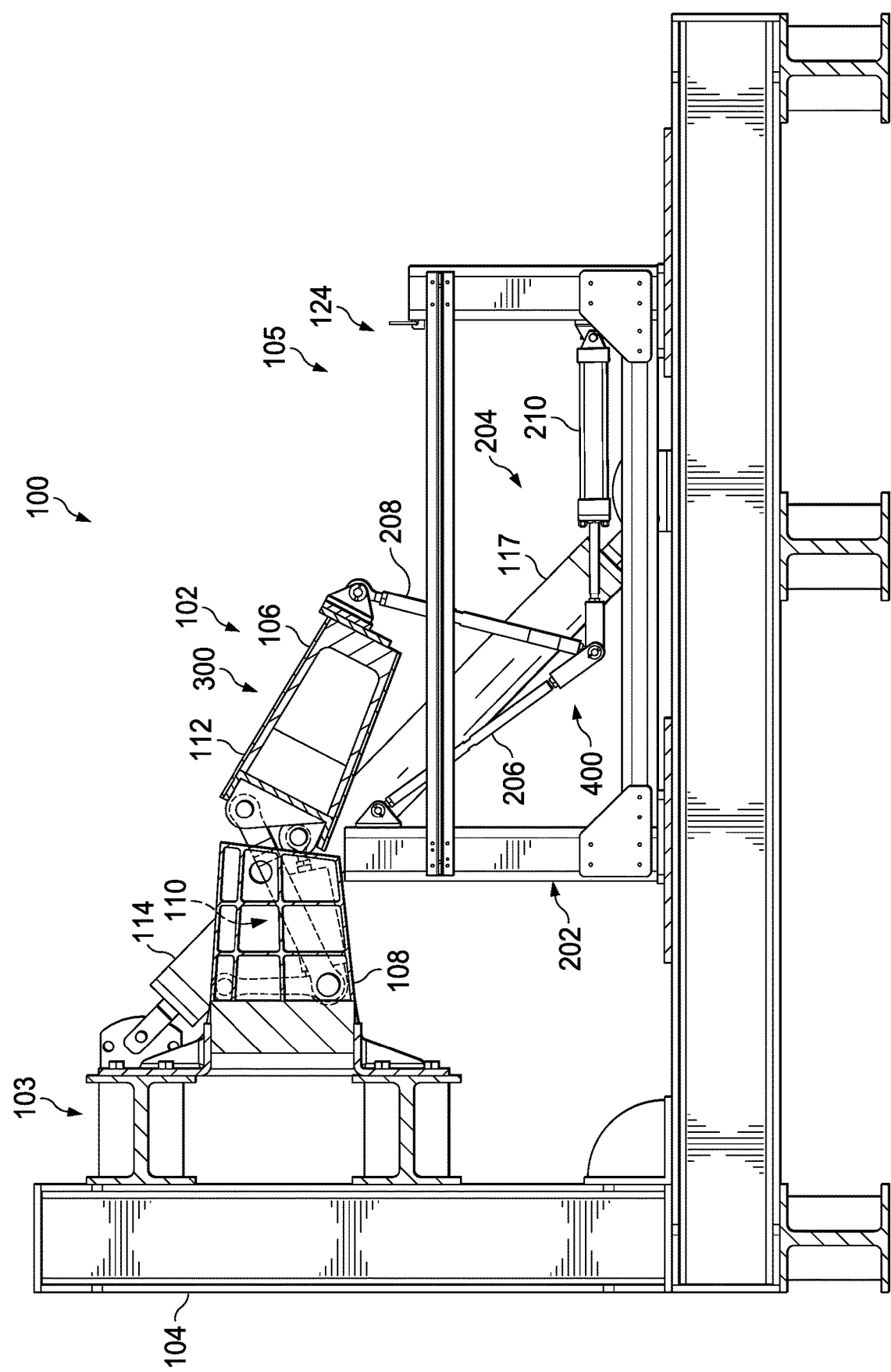
FIG. 4 is an illustration of a side view of the test system from FIG. 3 in accordance with an example embodiment.

FIG. 4 is an illustration of a side view of test system 100 from FIG. 3 in accordance with an example embodiment. Support 115 is not shown such that load system 124 may be more clearly seen. With control surface 106 at test position 300, linkage system 204 has configuration 400. In configuration 400, the angle between load member 208 and control surface 106 is maintained within selected tolerances of 90 degrees. In other words, the angle between load member 208 and control surface 106 is perpendicular or near perpendicular.

During load testing at test position 300, linkage system 204 maintains configuration 400 until maximum load limits are reached. The maximum load limits may be considered reached when linkage system 204 moves out of configuration 400. For example, the maximum load limits may be reached when control surface 106 stalls or is overloaded such that control surface 106 is forced back into or towards neutral position 134 in FIG. 1-2.

Figure 5:
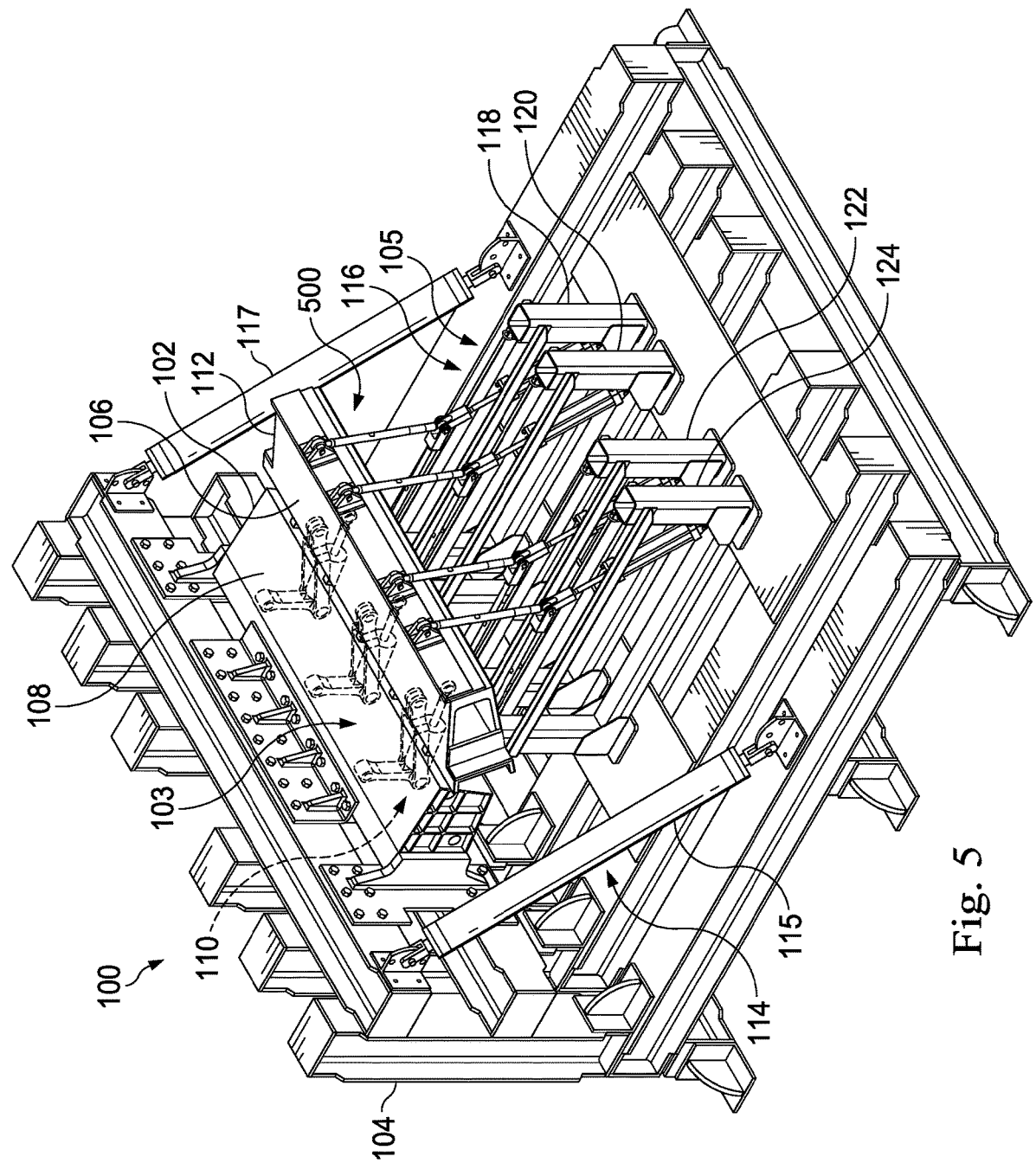
FIG. 5 is an illustration of the test system from FIG. 1 with the control surface at a test position in accordance with an example embodiment.

FIG. 5 is an illustration of test system 100 from FIG. 1 with control surface 106 at test position 500. In this illustrative example, test position 500 is one in which control surface 106 is angled downwards relative to attachment structure 108, and thereby base structure 103. In this example, control surface 106 is angled at about 33 degrees upwards relative to neutral position 134 in FIG. 1.

With control surface 106 at test position 500, test system 100 may be used to apply one or more load profiles to control surface 106. For example, an initial load profile may be applied to control surface 106. The initial load profile may be an initial loading condition of zero load or minimal load. Test system 100 may then sweep through one or more additional load profiles, increasing the loads applied to control surface 106 until maximum load limits are reached.

Figure 6:
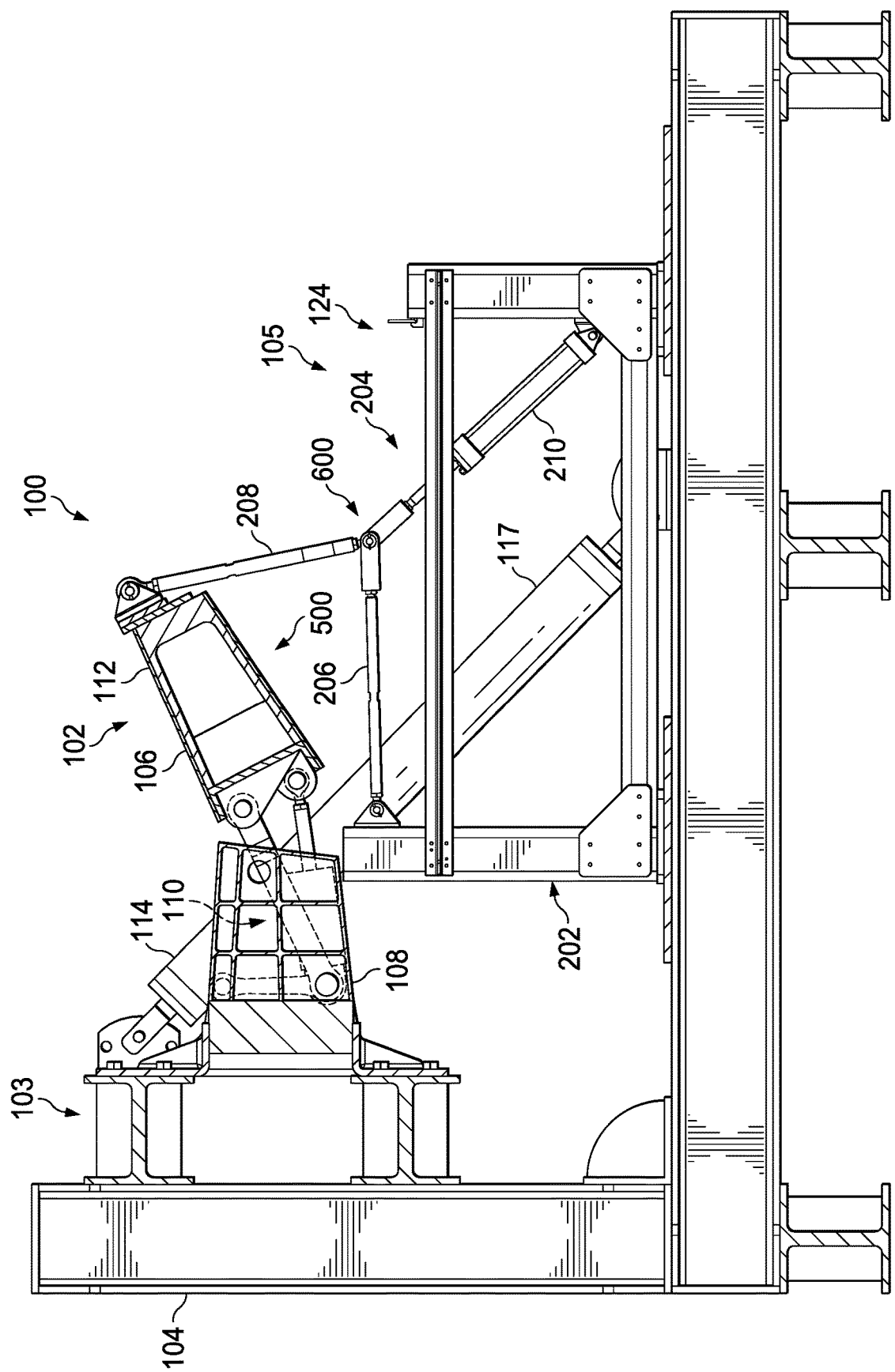
FIG. 6 is an illustration of a side view of the test system from FIG. 5 in accordance with an example embodiment.

FIG. 6 is an illustration of a side view of the test system from FIG. 5 in accordance with an example embodiment. Support 115 is not shown such that load system 124 may be more clearly seen. With control surface 106 at test position 500, linkage system 204 has configuration 600. Even in configuration 600, the angle between load member 208 and control surface 106 is maintained within selected tolerances of 90 degrees.

During load testing at test position 500, linkage system 204 maintains configuration 600 until maximum load limits are reached. The maximum load limits may be considered reached when linkage system 204 moves out of configuration 600. For example, the maximum load limits may be reached when control surface 106 stalls or is overloaded such that control surface 106 is forced back into or towards neutral position 134 in FIG. 1-2.

Figure 7:
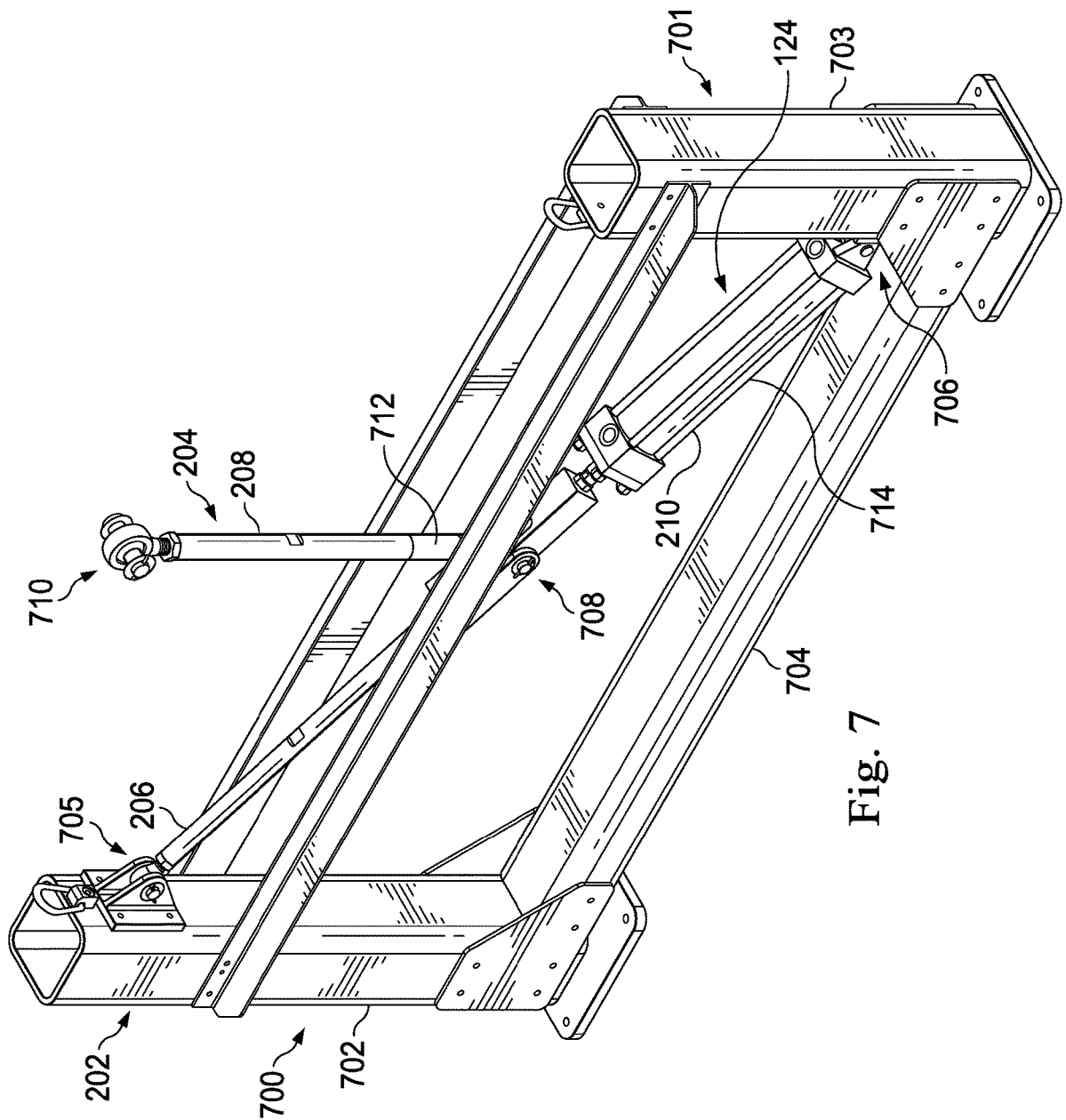
FIG. 7 is an illustration of an enlarged isometric view of the load system from FIGS. 1-6 in accordance with an example embodiment.

FIG. 7 is an illustration of an enlarged isometric view of load system 124 from FIGS. 1-6 in accordance with an example embodiment. Frame 202 and linkage system 204 are more clearly seen in this view. Linkage system 204 is shown having neutral configuration 212 corresponding to neutral position 134 of control surface 106 as shown in FIGS. 1 and 2.

Frame 202 has first side 700 and second side 701, which are opposite sides of frame 202. Frame 202 may be a monolithic, integrated structure or may be comprised of two or more components connected together. Frame 202 includes frame portion 702 at first side 700 and frame portion 703 at second side 701. Further, frame 202 includes frame portion 704 that connects frame portion 702 and frame portion 703. In one illustrative example, frame portion 702 and frame portion 703 are vertical portions with frame portion 704 being a horizontal portion connecting the vertical portions.

Linkage system 204 is connected to frame 202 via joint 705 and joint 706. Support member 206, load member 208, and actuating member 210 of linkage system 204 are connected together via joint 708. Joint 708 may include one or more joints. For example, joint 708 may be a "multijoint". Each of joint 705, joint 706, and the one or more joints that comprise joint 708 provides at least one degree of rotational freedom.

Support member 206 of linkage system 204 is movably connected to frame portion 702 at first side 700 via joint 705. Joint 705 may be a hinged joint or rotatable joint. In this illustrative example, joint 705 provides three degrees of rotational freedom (e.g., via a spherical bearing). Actuating member 210 is movably connected to frame portion 703 at second side 701 of frame 202 via joint 706. Thus, support member 206 and actuating member 210 are connected to opposite sides of frame 202. Similar to joint 705, joint 706 may be a hinged joint or rotatable joint.

Load member 208 is movably connected to both support member 206 and actuating member 210 via joint 708. In this example, joint 708 may be a multijoint that includes a hinged joint and a spherical bearing. In this illustrative example, joint 705 provides one degree of rotational freedom for load member 208. Load member 208 is also associated with connector 710, which is used to connect load member 208 to control surface 106 in FIGS. 1-6 at a joint (not shown) that provides at least one degree of rotational freedom. This joint may be yet another hinged joint or rotatable joint. For example, the joint may include a spherical bearing. Depending on the implementation, connector 710 may be integrated as part of load member 208 or a separate component connected to load member 208.

In one or more examples, load member 208 is associated with load measurement device 712. Load measurement device 712 may include at least one of, for example, without limitation, a load cell, a load pin, a strain gauge, or some other type of device for measuring load or strain. Load measurement device 712 may be associated with load member 208 by being attached to, secured to, or otherwise connected to, indirectly or directly, load member 208. Alternatively, load measurement device 712 may be integrated as part of load member 208. Load measurement device 712 is used to measure the load applied to control surface 106 by load member 208.

Actuating member 210 is associated with actuator 714. Actuator 714 may be associated with actuating member 210 by being attached to, secured to, or otherwise connected to, indirectly or directly, actuating member 210. Alternatively, actuator 714 may be associated with actuating member 210 by being integrated as part of actuating member 210.

In this illustrative example, actuator 714 is a hydraulic actuator. In other examples, actuator 714 may be an electric actuator or some other type of actuator. Actuator 714 may be operated via a single setting (or parameter). When actuator 714 takes the form of a hydraulic actuator, this setting may be a pressure setting (i.e., a hydraulic pressure setting). This pressure setting may be controlled to control the load applied to control surface 106 by load member 208. The actual load applied to control surface 106 is a function of the pressure setting and the geometry of linkage system 204.

Thus, changing the pressure setting of actuator 714 without changing the geometry of linkage system 204 (i.e., not moving control surface 106 and thereby not moving linkage system 204) may change the discrete load applied to control surface 106 by load member 208. Similarly, a constant load may be maintained for two different positions of control surface 106 (i.e., two different geometries for linkage system 204) by having two different values for the pressure setting of actuator 714. As another example, the load applied to control surface 106 may be changed by moving control surface 106, thereby changing the geometry of linkage system 204, but not changing the pressure setting of actuator 714.

Linkage system 204 is designed such that a single pressure setting for actuator 714 can be used to apply a desired loading profile to a corresponding load point on control surface 106. Specifically, the lengths of support member 206, load member 208, and actuating member 210, as well as the locations of joint 705 and joint 706, may be selected such that a single pressure setting for actuator 714 can be used to apply the proper load to control surface 106 based on a selected load profile. The pressure setting needed to apply the proper load for a particular geometry of linkage system 204 based on the selected load profile may be determined via a mathematical analysis tool.

The setting for actuator 714 may be physically adjusted at actuator 714 or remotely controlled. For example, remote control unit 136 from FIG. 1 may be used to control the pressure setting of actuator 714. The load applied by load member 208 based on the pressure setting of actuator 714 simulates an aerodynamic load on control surface 106.

Figure 8:
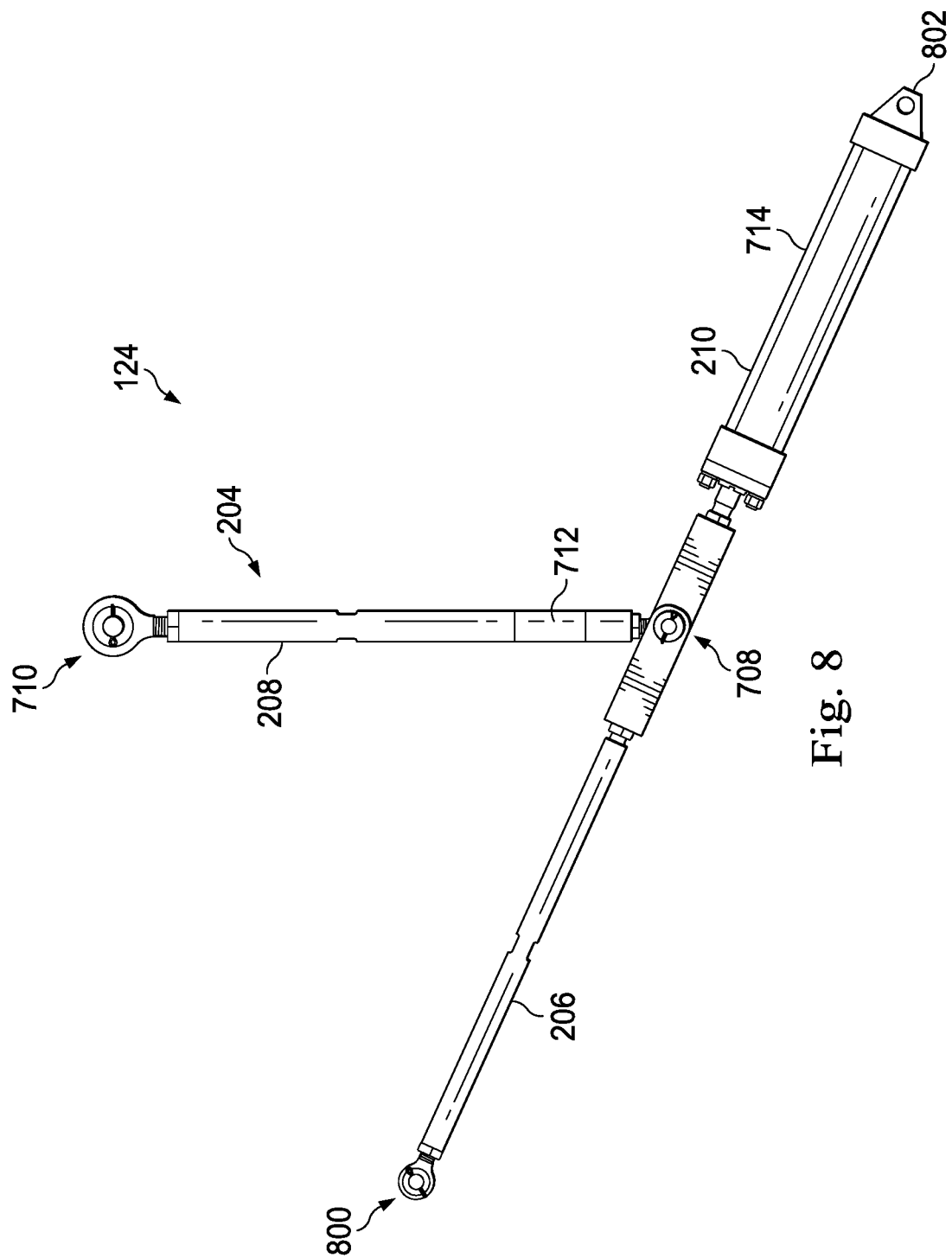
FIG. 8 is an illustration of a side view of the linkage system of the load system from FIG. 7 having a neutral configuration in accordance with an example embodiment.

FIG. 8 is an illustration of a side view of linkage system 204 of load system 124 from FIG. 7 having a neutral configuration in accordance with an example embodiment. In particular, linkage system 204 is shown in neutral configuration 212 from FIGS. 2 and 7. Connector 800 is used to connect support member 206 to frame portion 702 of frame 202 in FIG. 7 to form joint 705. Connector 800 may be a part of support member 206 or a separate component connected to support member 206. Connector 802 is used to connect actuating member 210 to frame portion 703 of frame 202 in FIG. 7 to form joint 706. Further, connector 802 may be a part of actuating member 210 or may be a separate component connected to actuating member 210.

Figure 9:
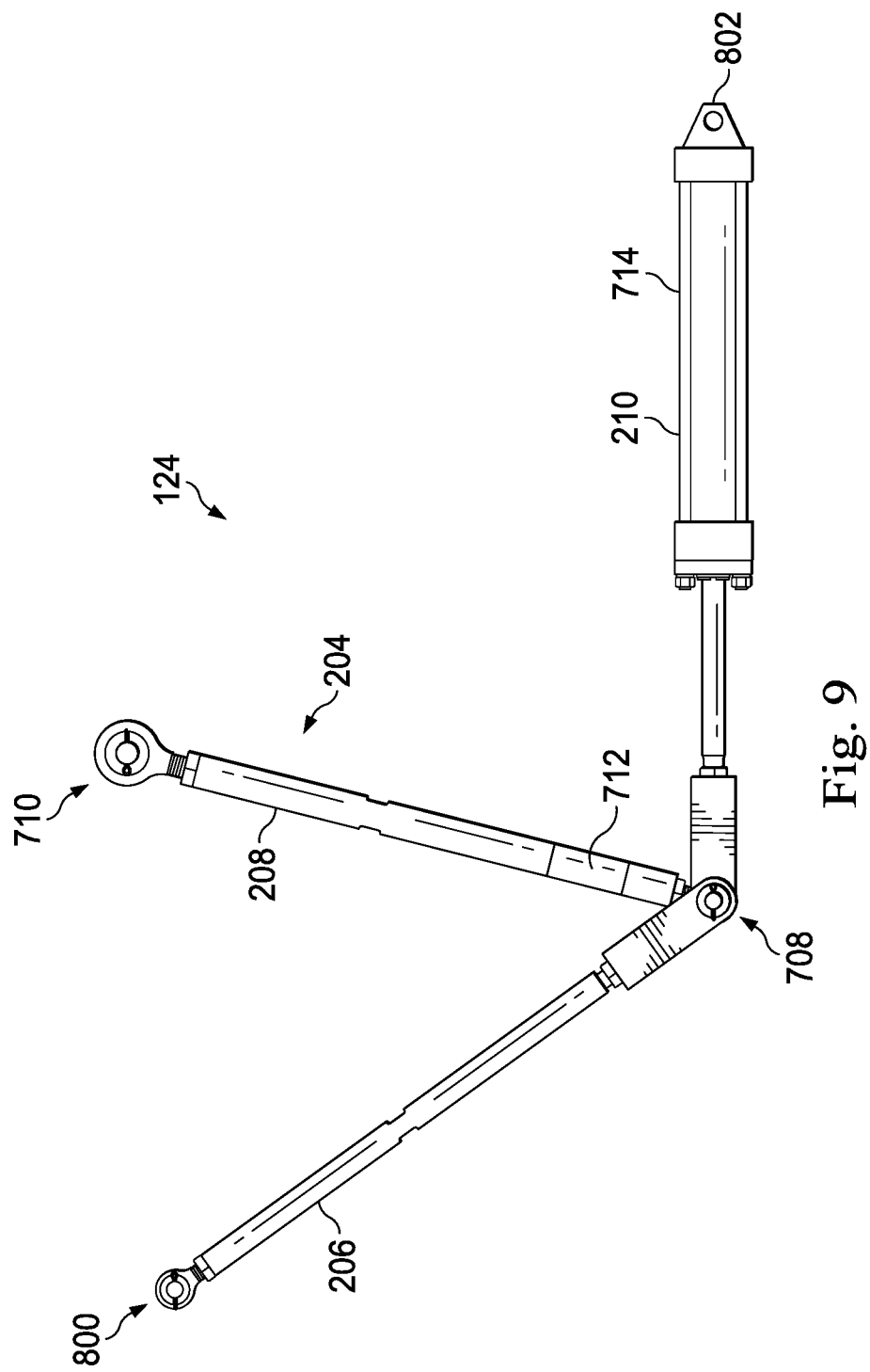
FIG. 9 is an illustration of a side view of the linkage system of the load system from FIG. 7 having a different configuration in accordance with an example embodiment.

FIG. 9 is an illustration of a side view of linkage system 204 of load system 124 having a different configuration in accordance with an example embodiment. In particular, linkage system 204 is shown having configuration 400 from FIG. 4.

Figure 10:
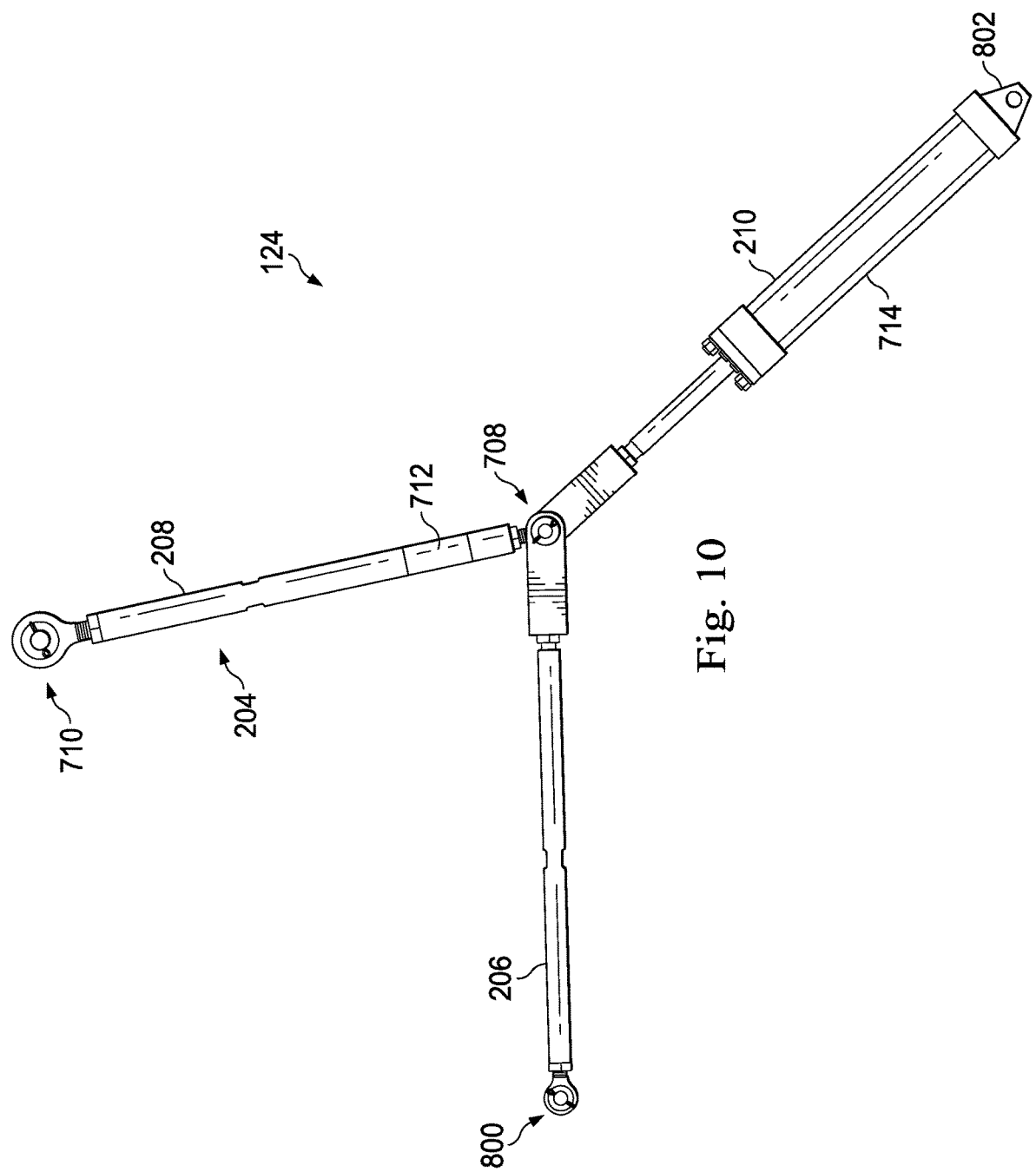
FIG. 10 is an illustration of a side view of the linkage system of the load system from FIG. 7 having another configuration in accordance with an example embodiment.

FIG. 10 is an illustration of a side view of linkage system 204 of load system 124 having yet another configuration in accordance with an example embodiment. In particular, linkage system 204 is shown having configuration 600 from FIG. 6.

The illustrations of test system 100 and the various components of test system 100 in FIGS. 1-10 are not meant to imply physical or architectural limitations to the manner in which an example embodiment may be implemented. Other components in addition to or in place of the ones illustrated may be used. Some components may be optional.

Figure 11:
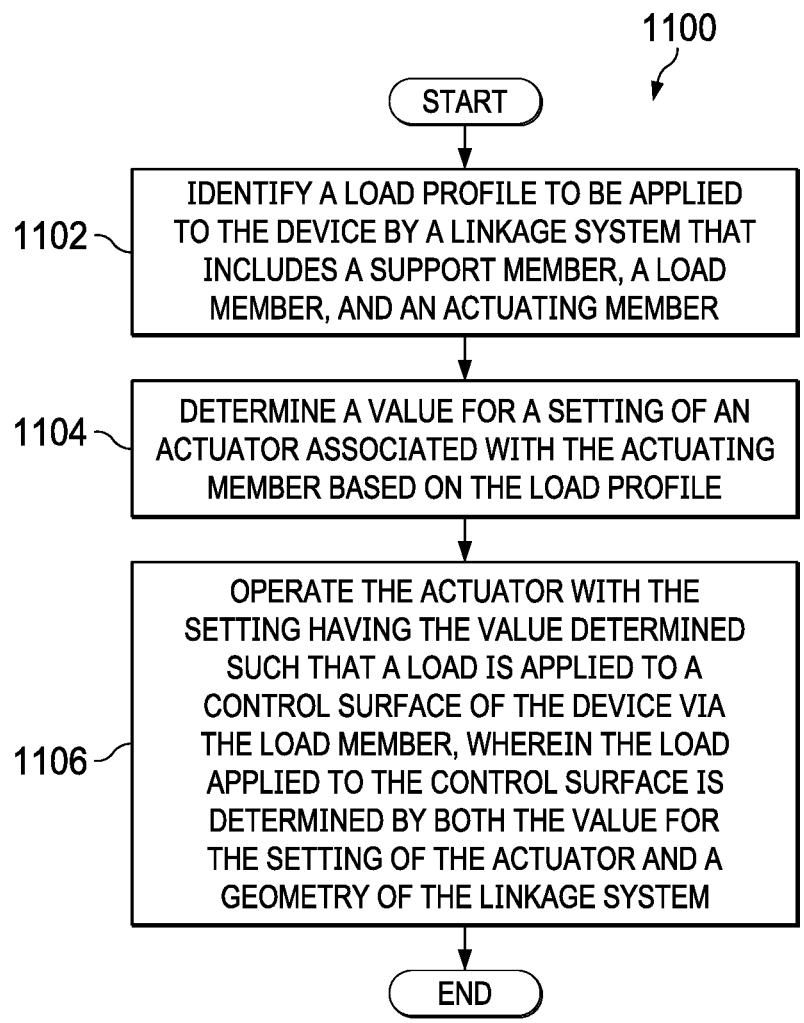
FIG. 11 is a flowchart of a process for testing a performance of a device under different load conditions in accordance with an example embodiment.

FIG. 11 is a flowchart of a process for testing a performance of a device under different load conditions in accordance with an example embodiment. Process 1100 illustrated in FIG. 11 may be performed using, for example, test system 100 described in FIGS. 1-10.

Process 1100 may begin by identifying a load profile to be applied to the device by a linkage system that includes a support member, a load member, and an actuating member (operation 1102). The device may be, for example, device 102 in FIG. 1. In some illustrative examples, the device includes a control surface such as, for example, a rudder, an elevator, a flaperon, an aileron, a spoiler, or some other type of control surface. The linkage system may be part of a load application system such as, for example, load application system 105 in FIG. 1. The load application system may include one or more load systems, each of which includes a linkage system such as, for example, linkage system 204 in FIG. 2.

Process 1100 further includes determining a value for a setting of an actuator associated with the actuating member based on the load profile (operation 1104). When the actuator is a hydraulic actuator, operation 1104 includes determining a pressure setting for the hydraulic actuator. The pressure setting may be controlled manually or remotely.

Process 1100 further includes operating the actuator with the setting having the value determined such that a load is applied to a control surface of the device via the load member of the linkage system, wherein the load applied to the control surface is determined by the setting of the actuator and a geometry of the linkage system (operation 1106), with the process terminating thereafter. In operation 1106, operating the actuator may include, for example, energizing the actuator with the value determined for the setting of the actuator. The geometry of the linkage system includes how the actuating member, the support member, and the linkage system are oriented relative to each other and the lengths of these three members. Further, the geometry may include how the actuating member and the support member are connected to the frame of the linkage system (i.e., the location on the frame at which the actuating member is connected and the location on the frame at which the supporting member is connected).

When operation 1106 is performed with the control surface in a test position angled in a direction away from the frame, a resistive tension load is applied to the control surface. When operation 1108 is performed with the control surface in a test position that is angled in a direction towards the frame, a resistive compression load is applied to the control surface.

In some illustrative examples, operations 1102-1106 may be repeated multiple times for different load profiles while the control surface of the device is in a given test position. In other illustrative examples, the control surface may be moved into a plurality of test positions while the load is being applied to the control surface.

Figure 12:
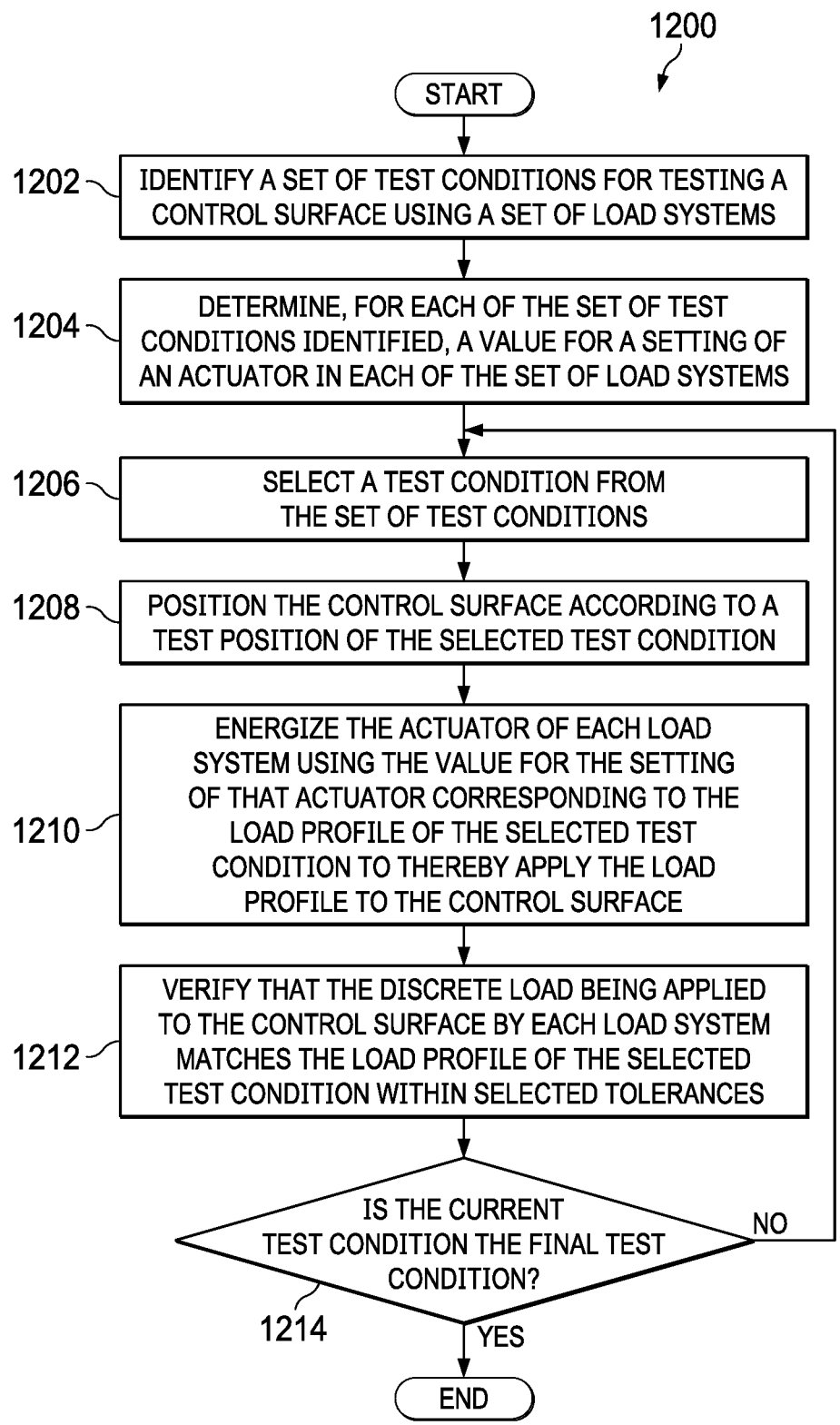
FIG. 12 is a flowchart of a process for testing a performance of a device under different load conditions in accordance with an example embodiment.

FIG. 12 is a flowchart of a process for testing a performance of a device under different load conditions in accordance with an example embodiment. Process 1200 illustrated in FIG. 12 may be performed using, for example, test system 100 described in FIGS. 1-10.

Process 1200 may begin by identifying a set of test conditions for testing a control surface using a set of load systems (operation 1202). As used herein, a "set of" items may include one or more items. Accordingly, a set of test conditions may be one or more test conditions and a set of load systems may be one or more load systems. In these illustrative examples, a test condition is a combination of a test position for the control surface and a load profile for the control surface.

A test position may be, for example, an angular deflection of the control surface. In one illustrative example, the set of test positions includes a sweep of positions between a maximum deflection in one direction (e.g., −30 degrees from a neutral position) and a maximum deflection in another direction (e.g., {+30 degrees from a neutral position). In other examples, the maximum deflection in either direction may be between about 10 degrees and about 60 degrees away from the neutral position.

In these illustrative examples, a load profile includes a set of discrete loads that are to be applied at a corresponding set of load points on the control surface. This set of discrete loads is to be applied to the control surface by a set of load systems in a load application system, such as load application system 105 in FIG. 1. Each load system in the load application system may be implemented in a manner similar to load system 124 described in FIGS. 1-6. Each load system includes a frame and a linkage system. The linkage system of each load system may be implemented in a manner similar to linkage system 204 as described in FIGS. 7-10. As one example, each linkage system includes an actuating member connected to the frame, a support member connected to the frame, and a load member connected to the actuating member, the support member, and the control surface.

Thus, a load profile may include the load that is to be applied at a corresponding load point on the control surface by each load system of the set of load systems. In these illustrative examples, each load system may be set to apply the same load to the control surface for a given load profile. In other cases, one load system may be set to apply a load that is different from at least one another load system.

In operation 1202, each test condition is a unique combination of a test position and a load profile. For example, two test conditions may have a same test position but two different load profiles. In another example, two test conditions may have a same load profile but two different test positions.

Thereafter, process 1200 includes determining, for each of the set of test conditions identified, a value for a setting of an actuator in each of the set of load systems (operation 1204). In operation 1204, for each test condition, the value for an actuator setting is determined based on the load profile of that test condition. This determination is made based on the geometry of a linkage system in each load system. For each load system, the actuator is part of the actuating member of the linkage system of that load system.

Operation 1204 takes into account that an actual load profile that is applied to the control surface is a function of both the value for the setting of the actuator and the geometry of the linkage system. The geometry of the linkage system is different for different positions of the control surface. In other words, the orientations of the load member, the actuating member, and the support member of the linkage system relative to each other is different for each different position of the control surface. Thus, the value for the setting of an actuator of a particular load system for a particular load profile (and thereby, a particular test position) may be determined (e.g., computed using a mathematical analysis tool) based on the load that is to be applied to the control surface by the load system according to the load profile and the known geometry of the linkage system at the test position corresponding to that load profile. In some illustrative examples, the value for the setting of the actuator may be constant for multiple different load profiles.

Thereafter, a test condition is selected from the set of test conditions (operation 1206). The control surface is positioned according to a test position of the selected test condition (operation 1208). In these illustrative examples, operation 1208 includes moving the control surface to deflect an edge (e.g., trailing edge) of the control surface. In some cases, if the control surface is already in the test position, operation 1208 may be performed by simply leaving the control surface at its current position.

Next, the actuator of each load system is energized using the value for the setting of that actuator corresponding to the load profile of the selected test condition to thereby apply the load profile to the control surface (operation 1210). In operation 1210, each load system applies a discrete load at a corresponding load point on the control surface. As discussed above, the discrete load applied to the control surface is a function of the value for the setting of the actuator and the geometry of the linkage system of the load system.

In some cases, operation 1210 includes leaving the setting of the actuator as is. In other cases, operation 1210 includes changing the setting of the actuator. For example, when the actuator is a hydraulic actuator, operation 1210 may be performed by increasing or decreasing a pressure setting for the hydraulic actuator.

Next, process 1200 includes verifying that the discrete load being applied to the control surface by each load system matches the load profile of the selected test condition within selected tolerances (operation 1212). A determination is then made as to whether the current test condition is the final test condition (operation 1214). If the current test condition is the final test condition, process 1200 terminates. Otherwise, process 1200 returns to operation 1206 described above.

Thus, as illustrated by process 1200, a control surface may be tested under a variety of test conditions using a single setting for a single actuator in each load system of a set of load systems. For example, the control surface may be swept through a range of positions under a variety of load conditions without needing to adjust the configuration of large or complex equipment.

Figure 13:
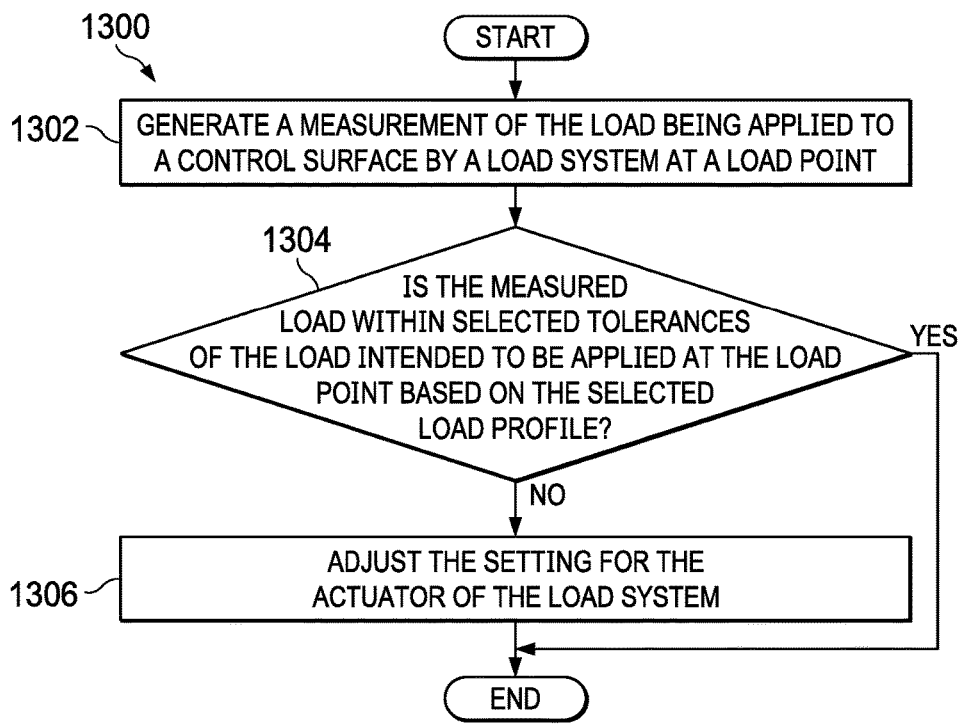
FIG. 13 is an illustration of a process for verifying that a load being applied to a control surface matches a load profile in accordance with an example embodiment.

FIG. 13 is an illustration of a process for verifying that a load being applied to a control surface matches a load profile in accordance with an example embodiment. Process 1300 may be an example of one manner in which operation 1212 in FIG. 12 may be implemented. In some cases, process 1300 may be at least partially implemented using a computer that is part of a test system, such as test system 100 described in FIGS. 1-10.

Process 1300 includes generating a measurement of the load being applied to a control surface by a load system at a load point (operation 1302). Operation 1302 may be performed using, for example, a load measurement device associated with the load member of the linkage system of the load system. The load measurement device may include at least one of, for example, without limitation, a load cell, a load pin, a strain gauge, or some other type of device for measuring load or strain. Next, a determination is made as to whether the measured load is within selected tolerances of the load intended to be applied at the load point based on the selected load profile (operation 1304). If the measured load is within selected tolerances of the intended load, the process terminates. Otherwise, the setting for the actuator of the load system is adjusted (operation 1306), with the process then returning to operation 1302 described above.

Figure 14:
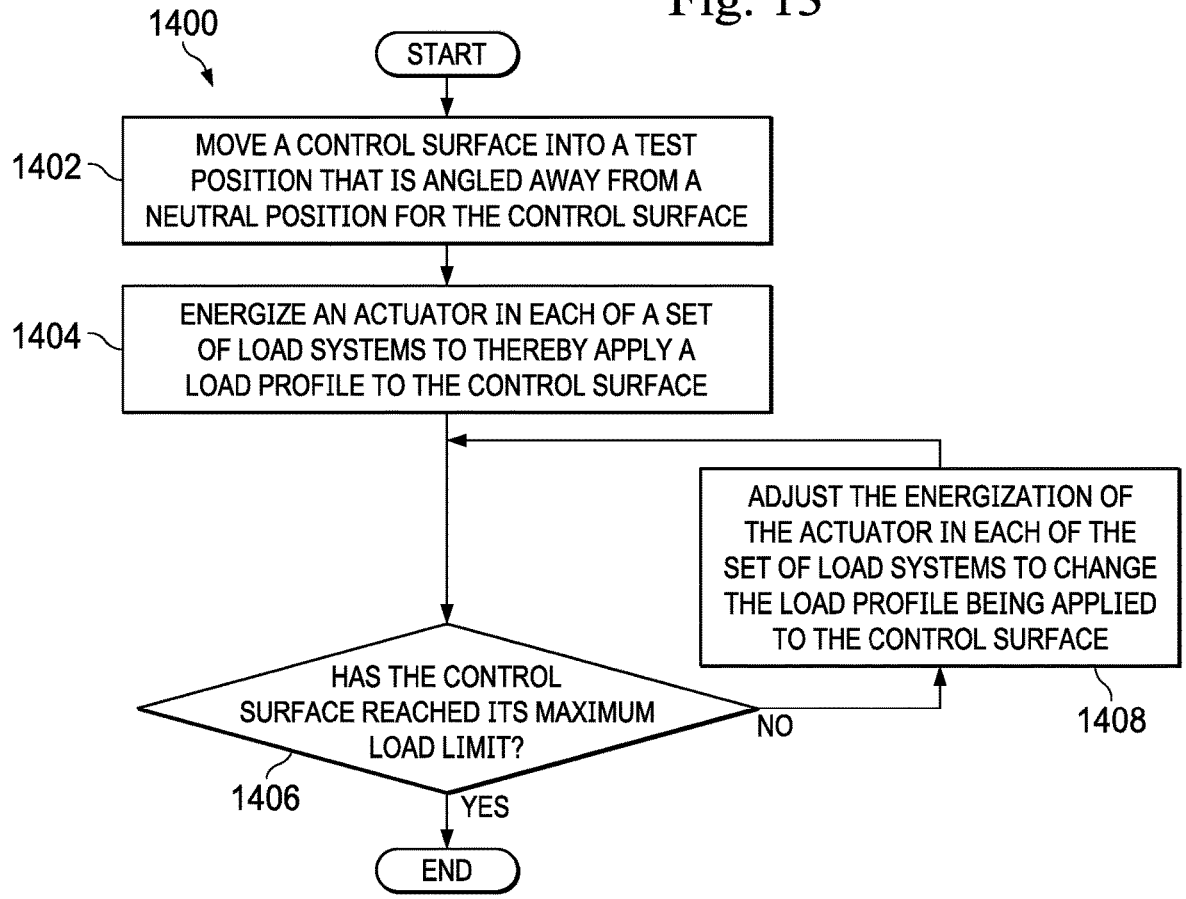
FIG. 14 is a flowchart of a process for testing the maximum load limits of a control surface in accordance with an example embodiment.

FIG. 14 is a flowchart of a process for testing the maximum load limits of a control surface in accordance with an example embodiment. Process 1400 may be performed using a test system such as, for example, test system 100 described in FIGS. 1-10 to test the maximum load limits of a control surface.

Process 1400 may begin by moving a control surface into a test position that is angled away from a neutral position for the control surface (operation 1402). An actuator in each of a set of load systems is energized to thereby apply a load profile to the control surface (operation 1404). In other illustrative examples, operation 1404 may be performed prior to moving the control surface into the test position.

Thereafter, a determination is made as to whether the control surface has reached its maximum load limit (operation 1406). In operation 1406, the control surface may be considered as having reached its maximum load limit if the control surface has blown back (e.g., blown down, up, or sideways) towards the neutral position. If the control surface has reached its maximum load limit, the process terminates.

Otherwise, the energization of the actuator in each of the set of load systems is adjusted to change the load profile being applied to the control surface (operation 1408), with the process then returning to operation 1406 described above. With respect to operation 1408, in these examples, the load profile may be adjusted such that the load being applied to the control surface by each load system of the set of load systems is increased. As one specific example, when the actuator in each load system is a hydraulic actuator, the value for the pressure setting of the actuator may be increased.

Figure 15:
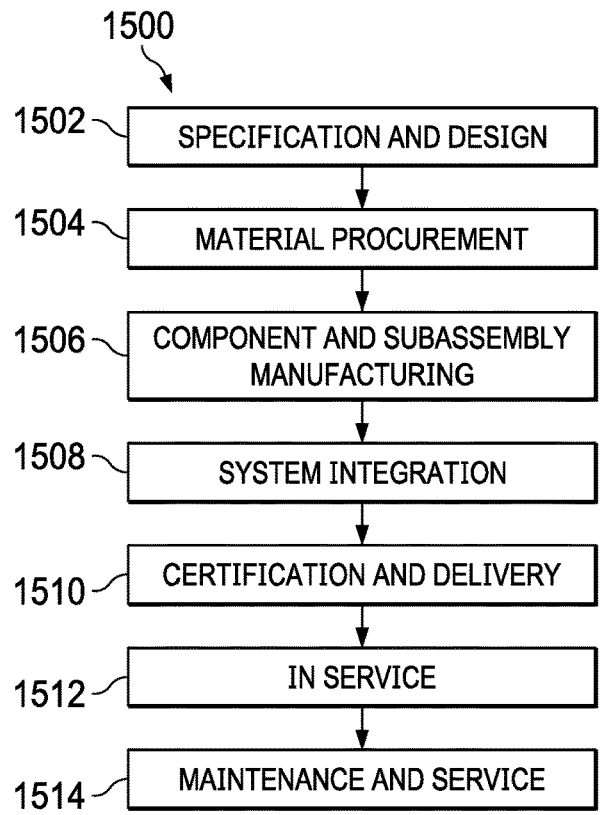
FIG. 15 is an illustration of an aircraft manufacturing and service method in accordance with an example embodiment.
Figure 16:
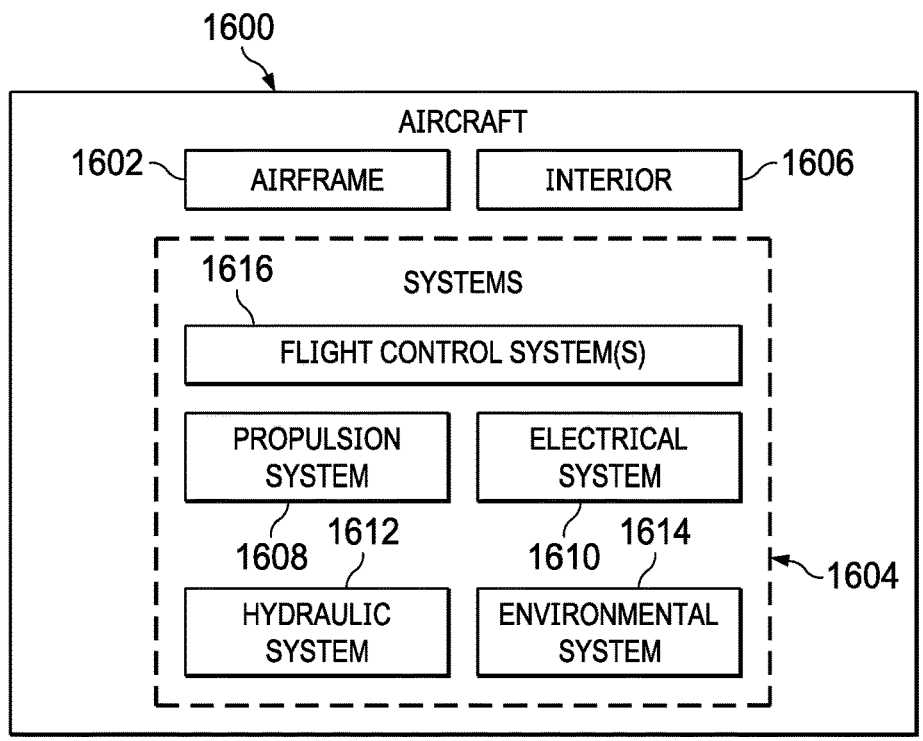
FIG. 16 is a block diagram of an aircraft in accordance with an example embodiment.

Example embodiments of the disclosure may be described in the context of aircraft manufacturing and service method 1500 as shown in FIG. 15 and aircraft 1600 as shown in FIG. 16. Turning first to FIG. 15, an illustration of an aircraft manufacturing and service method is depicted in accordance with an illustrative embodiment. During pre-production, aircraft manufacturing and service method 1500 may include specification and design 1502 of aircraft 1600 in FIG. 16 and material procurement 1504.

During production, component and subassembly manufacturing 1506 and system integration 1508 of aircraft 1600 in FIG. 16 takes place. Thereafter, aircraft 1600 in FIG. 16 may go through certification and delivery 1510 in order to be placed in service 1512. While in service 1512 by a customer, aircraft 1600 in FIG. 16 is scheduled for routine maintenance and service 1514, which may include modification, reconfiguration, refurbishment, and other maintenance or service.

Each of the processes of aircraft manufacturing and service method 1500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 16, an illustration of an aircraft is depicted in which an illustrative embodiment may be implemented. In this example, aircraft 1600 is produced by aircraft manufacturing and service method 1500 in FIG. 15 and may include airframe 1602 with plurality of systems 1604 and interior 1606. Examples of systems 1604 include, but are not limited to, one or more of propulsion system 1608, electrical system 1610, hydraulic system 1612, environmental system 1614, and flight control system(s) 1616. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1500 in FIG. 15. In particular, test system 100 from FIGS. 1-10 may be used to test flight control surfaces during one or more of the stages of aircraft manufacturing and service method 1500. For example, without limitation, test system 100 may be used during at least one of specification and design 1502, component and subassembly manufacturing 1506, system integration 1508, certification and delivery 1510, routine maintenance and service 1514, or some other stage of aircraft manufacturing and service method 1500. Still further, test system 100 may be used to test device 102 from FIG. 1, which may be or may be a representation of a component of aircraft 1600. For example, device 102 may be considered part of flight control system(s) 1616. In some cases, device 102 may be one of systems 1604 of aircraft 1600 that is controlled by or commanded by flight control system(s) 1616.

In one illustrative example, components or subassemblies produced in component and subassembly manufacturing 1506 in FIG. 15 may be fabricated or manufactured in a manner similar to components or subassemblies produced while aircraft 1600 is in service 1512 in FIG. 15. As yet another example, one or more apparatus embodiments, method embodiments, or a combination thereof may be utilized during production stages, such as component and subassembly manufacturing 1506 and system integration 1508 in FIG. 15. One or more apparatus embodiments, method embodiments, or a combination thereof may be utilized while aircraft 1600 is in service 1512 and/or during maintenance and service 1514 in FIG. 15. The use of a number of the different illustrative embodiments may substantially expedite the assembly of and/or reduce the cost of aircraft 1600.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for loading a device, the apparatus comprising:
   a frame; and
   a linkage system connected to the frame, wherein the linkage system comprises:
      a support member movably connected to the frame;
      an actuating member movably connected to the frame; and
      a load member that is movably connected to the actuating member and the support member, and is configured to be connected to the device, wherein operation of the actuating member when the load member is connected to the device loads the device; and
   a load measurement device, associated with the load member, for measuring a load applied to the device by the load member;
   wherein the support member is movably connected to a first side of the frame at a first joint;
   wherein the actuating member is movably connected to a second side of the frame at a second joint;
   wherein the device is loaded with the device at a test position; and
   wherein a first length of the support member, a second length of the load member, a third length of the actuating member, a first location of the first joint relative to the frame, and a second location of the second joint relative to the frame are selected to ensure that the load member maintains an angle within selected tolerances of being perpendicular to the device at the test position of the device.

2. The apparatus of claim 1, wherein the load measurement device comprises at least one of a load cell, a load pin, a strain gauge.

3. The apparatus of claim 1, wherein the actuating member, the support member, and the load member are movably connected together via a joint and wherein the actuating member and the support member are connected to opposite sides of the frame.

4. The apparatus of claim 1, wherein the selected tolerances are at most 10°.

5. The apparatus of claim 1, wherein the actuating member comprises:
   an actuator, wherein a first location of the first joint relative to the frame and a second location of the second joint relative to the frame are selected such that controlling a single pressure setting for the actuator is sufficient to load the device based on a selected load profile.

6. The apparatus of claim 1, wherein the selected tolerances are at most 3°.

7. The apparatus of claim 1, wherein the actuating member comprises:
   an actuator;
the apparatus further comprising:
   a remote control unit in communication with the hydraulic actuator, wherein the remote control unit controls a pressure setting of the hydraulic actuator to control a load applied to a control surface of the device by the load member.

8. The apparatus of claim 1, wherein the device comprises a control surface, a movement system, and an attachment structure.

9. The apparatus of claim 1, wherein the load member is configured to be connected to the device such that movement of the device causes the linkage system to move in a corresponding manner, and the selected tolerances are maintained when the device is at any angle between −33° and 37.5° relative to a predefined angular position of the device.

10. The apparatus of claim 9, wherein the selected tolerances are at most 5°.

11. The apparatus of claim 1, further comprising:
a platform, wherein the frame is attached to the platform; and
a base structure attached to the platform, wherein the device is attached to the base structure.

12. The apparatus of claim 11, further comprising:
a load application system comprising a plurality of load systems, wherein the frame and the linkage system form a load system of the plurality of load systems.

13. A system for loading a device, the system comprising:
a platform; and
a load application system comprising a plurality of load systems attached to the platform, each of the plurality of load systems comprising:
a frame; and
a linkage system connected to the frame, wherein the linkage system comprises:
a support member connected to the frame;
an actuating member connected to the frame; and
a load member that is movably connected to the actuating member, the support member, and the device, wherein operation of the actuating member when the load member is connected to the device loads the device; and
a load measurement device, associated with the load member, for measuring a load applied to the device by the load member.

14. A method for loading a device, the method comprising:
identifying a load profile to be applied to the device by a linkage system that includes a support member, a load member, and an actuating member;
determining a value for a setting of an actuator of the actuating member based on the load profile; and
operating the actuator with the setting having the value determined such that a load is applied to a control surface of the device via the load member, wherein the load applied to the control surface is determined by both the value for the setting of the actuator and a geometry of the linkage system.

15. The method of claim 14, further comprising:
measuring the load applied to the control surface using a load measurement device of the linkage system to verify that the load being applied to the device matches the load profile identified within selected tolerances.

16. The method of claim 14, wherein operating the actuator comprises:
controlling the setting of the actuator remotely.

17. The method of claim 14, further comprising:
moving the control surface of the device into a test position prior to applying the load to the control surface.

18. The method of claim 14, wherein determining the value for the setting comprises:
computing the value for the setting of the actuator based on the load profile identified and the geometry of the linkage system.

19. The method of claim 14, further comprising:
moving the control surface of the device into a test position, thereby causing the linkage system which is connected to the control surface to move into a configuration in which an angle between a load member of the linkage system and the control surface remains perpendicular within selected tolerances.

20. The method of claim 14, wherein operating the actuator comprises:
energizing the actuator based on the value determined for the setting, wherein the load is transferred from the actuating member to the control surface via the load member.

21. The method of claim 20, wherein the actuator is a hydraulic actuator and wherein determining the value for the setting comprises:
computing a value for a pressure setting of the hydraulic actuator based on the load profile.

22. The method of claim 14, further comprising:
moving the control surface of the device from a neutral position into a test position.

23. The method of claim 22, wherein the linkage system is connected to a frame and wherein operating the actuator comprises:
applying a resistive tension load to the control surface of the device when the test position for the control surface is angled in a direction away from the frame.

24. The method of claim 22, wherein the linkage system is connected to a frame and wherein operating the actuator comprises:
applying a resistive compression load to the control surface of the device when the test position for the control surface is angled in a direction towards the frame.

* * * * *